(12) United States Patent  
Piontek

(10) Patent No.: US 8,950,521 B2  
(45) Date of Patent: Feb. 10, 2015

(54) TRACTOR MOWER WITH ENHANCED TURNING RADIUS

(71) Applicant: Worldlawn Power Equipment, Inc., Beatrice, NE (US)

(72) Inventor: Alan F. Piontek, Lincoln, NE (US)

(73) Assignee: Worldlawn Power Equipment, Inc., Beatrice, NE (US)

( * ) Notice: Subject to any disclaimer, the term of this patent is extended or adjusted under 35 U.S.C. 154(b) by 0 days.

(21) Appl. No.: 13/857,718

(22) Filed: Apr. 5, 2013

(65) Prior Publication Data

US 2014/0298767 A1    Oct. 9, 2014

(51) Int. Cl.
- B62D 7/00       (2006.01)
- A01D 34/00      (2006.01)
- B62D 11/18      (2006.01)
- B62D 11/08      (2006.01)

(52) U.S. Cl.
CPC ............ *A01D 34/006* (2013.01); *B62D 11/183* (2013.01); *B62D 11/08* (2013.01)
USPC ....... 180/6.32; 180/6.48; 180/6.58; 180/6.34; 180/6.36; 180/6.38; 180/6.4

(58) Field of Classification Search
CPC .... B62D 11/183; B62D 11/08; B62D 11/006; B62K 26/02
USPC ........... 180/6.32, 6.48, 6.58, 6.34, 6.36, 6.38, 180/6.4
See application file for complete search history.

(56) References Cited

U.S. PATENT DOCUMENTS

| | | | |
|---|---|---|---|
| 2,366,207 A | 1/1945 | Milster | |
| 2,474,961 A | 7/1949 | Sneed | |
| 4,293,050 A | 10/1981 | Goloff et al. | |
| 5,975,224 A | 11/1999 | Satzler | |
| 6,059,383 A | 5/2000 | Paggi et al. | |
| 6,185,920 B1 | 2/2001 | Oxley | |
| 6,874,305 B2 * | 4/2005 | Ishimori | 56/10.8 |
| 7,152,704 B2 | 12/2006 | Uemura et al. | |
| 7,237,629 B1 | 7/2007 | Bland et al. | |
| 7,318,629 B1 | 1/2008 | Sun et al. | |
| 7,578,361 B2 | 8/2009 | Thacher | |
| 7,661,254 B2 | 2/2010 | Ishimori | |
| 7,686,107 B1 | 3/2010 | Bland et al. | |
| 7,708,091 B2 | 5/2010 | Osborne | |
| 7,712,845 B2 | 5/2010 | Mackovjak et al. | |
| 8,136,613 B2 * | 3/2012 | Schaedler et al. | 180/6.24 |
| 8,528,685 B2 * | 9/2013 | Scherbring et al. | 180/408 |

FOREIGN PATENT DOCUMENTS

JP        05-262258        10/1993

* cited by examiner

*Primary Examiner* — Joseph Rocca  
*Assistant Examiner* — Marlon Arce  
(74) *Attorney, Agent, or Firm* — Hovey Williams LLP

(57) ABSTRACT

A tractor mower with an enhanced turning radius comprising steerable left and right front wheels; left and right rear wheels; an engine for providing power to drive said rear wheels; an independent rear braking system capable of applying a braking force to said left and right rear wheels independently of one another; and a steering system coupled to said front steerable wheels and said independent rear braking system. The steering and braking systems may be configured such that when the tractor mower is steered in a first direction the front wheels are turned to the right and a braking force is applied on the right rear wheel. Alternatively, when the tractor mower is steered in a second direction the front wheels are turned to the left and a braking force is applied on the left rear wheel.

27 Claims, 9 Drawing Sheets

TRACTOR MOWER WITH ENHANCED TURNING RADIUS

BACKGROUND

1. Field

Embodiments of the present invention are directed to a tractor mower with an enhanced turning radius. In more detail, embodiments of the present invention are directed to a tractor mower with a steering system and a braking system, with the braking system dependent on the steering system, such that the tractor mower can be steered with an enhanced turning radius.

2. Related Art

The use of consumer-class tractor mowers has markedly increased in recent years. Such an increase is due, in part, to the reliability and affordability of such consumer-class tractor mowers. In addition to tractor mowers, the use of zero turning radius (ZTR)-class mowers has also increased. The ZTR-class mowers generally provide for increased maneuverability over the consumer-class tractor mowers. For instance, the ZTR-class mowers can be maneuvered through various degrees of turn, including turns requiring a generally zero magnitude turning radius. Consumer-class tractor mowers on the other hand are generally fitted with standard steering systems that facilitate sufficient maneuverability during normal operations (e.g., turns of less than 45 degrees). However, if such tractor mowers attempt to maneuver through steep turns (e.g., turns between 45 and 90 degrees), the tractor mowers may not satisfactorily handle the turns, resulting in damage to the turf, uneven wear on the tires, or other damage the tractor mowers. Additionally, tractor mowers are generally not capable of being retrofitted with more maneuverable steering systems, such as may be included in the ZTR-class mowers, due to design and cost considerations. Because the steering systems of the ZTR-class mowers often include complex hydraulic and/or electrical components, the cost of including such systems on consumer-class tractor mowers is generally not feasible.

SUMMARY

Embodiments of the present invention include a tractor mower comprising steerable left and right front wheels; left and right rear wheels; an engine for providing power to drive said rear wheels; an independent rear braking system capable of applying a braking force to the left and right rear wheels independently of one another; and a steering system coupled to the front steerable wheels and the independent rear braking system. In such embodiments, the steering system may further comprise a central pivot assembly rotatable about a main pivot axis; left and right steering rods coupled to and extending generally forward from the central pivot assembly; and left and right braking rods coupled to and extending generally rearward from the central pivot assembly. The steering and braking systems may be configured such that when the central pivot assembly is rotated in a first direction the steering rods are utilized to steer the front wheels to the right and the right braking rod is utilized to exert the braking force on the right rear wheel. Further, when the central pivot assembly is rotated in a second direction opposite the first direction the steering rods are utilized to steer the front wheels to the left and the left braking rod is utilized to exert the braking force on the left rear wheel.

Embodiments of the present invention may additionally include a tractor mower comprising steerable left and right front wheels; left and right rear drive wheels; an engine for providing power to drive the rear wheels; and a steering system coupled to the front steerable wheels and operable to steer the left and right front wheels at different steering angles. In such embodiments, the steering system may comprise a steering wheel; a steering member rotatable by the steering wheel on a main pivot axis; left and right intermediate pivot members rotatable on respective left and right intermediate pivot axes; left and right outer pivot members rotatable on respective left and right outer pivot axes; left and right steering rods connecting the steering member and the left and right intermediate pivot members respectively; and left and right rotation transfer members connecting the left and right intermediate pivot members and the left and right outer pivot members respectively in a manner such that rotation of the left and right intermediate pivot members causes rotation of the left and right outer pivot members respectively.

Embodiments of the present invention may further include a method for operating a tractor mower comprising the following steps: (a) rotating a steering wheel of the tractor mower from a central position to a full right steering position, wherein a first portion of the rotating of step (a) causes left and right front wheels of the tractor mower to steer to the right and does not simultaneously cause a braking force to be applied to a right rear wheel of the tractor mower, wherein a second portion of the rotating of step (a) simultaneously causes the left and right front wheels to steer to the right and causes a braking force to be applied to the right rear wheel; and (b) rotating a steering wheel of the tractor mower from a central position to a full left steering position, wherein a first portion of the rotating of step (b) causes the left and right front wheels to steer to the left and does not simultaneously cause a braking force to be applied to a left rear wheel of the tractor mower, wherein a second portion of the rotating of step (b) simultaneously causes the left and right front wheels to steer to the left and causes a braking force to be applied to the left rear wheel.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein.

Figure 1:
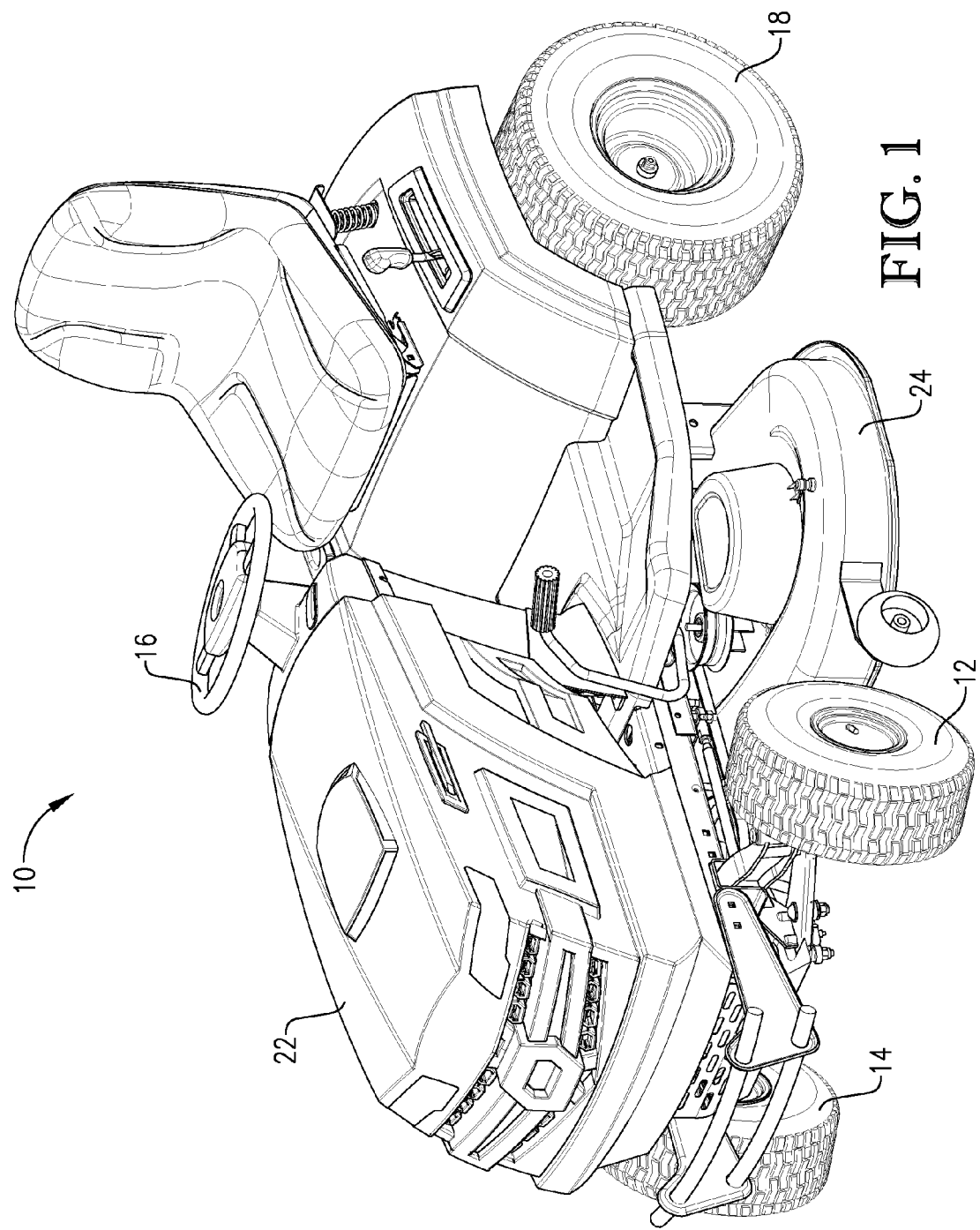
FIG. 1 is a front, left-side perspective view of a tractor mower in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
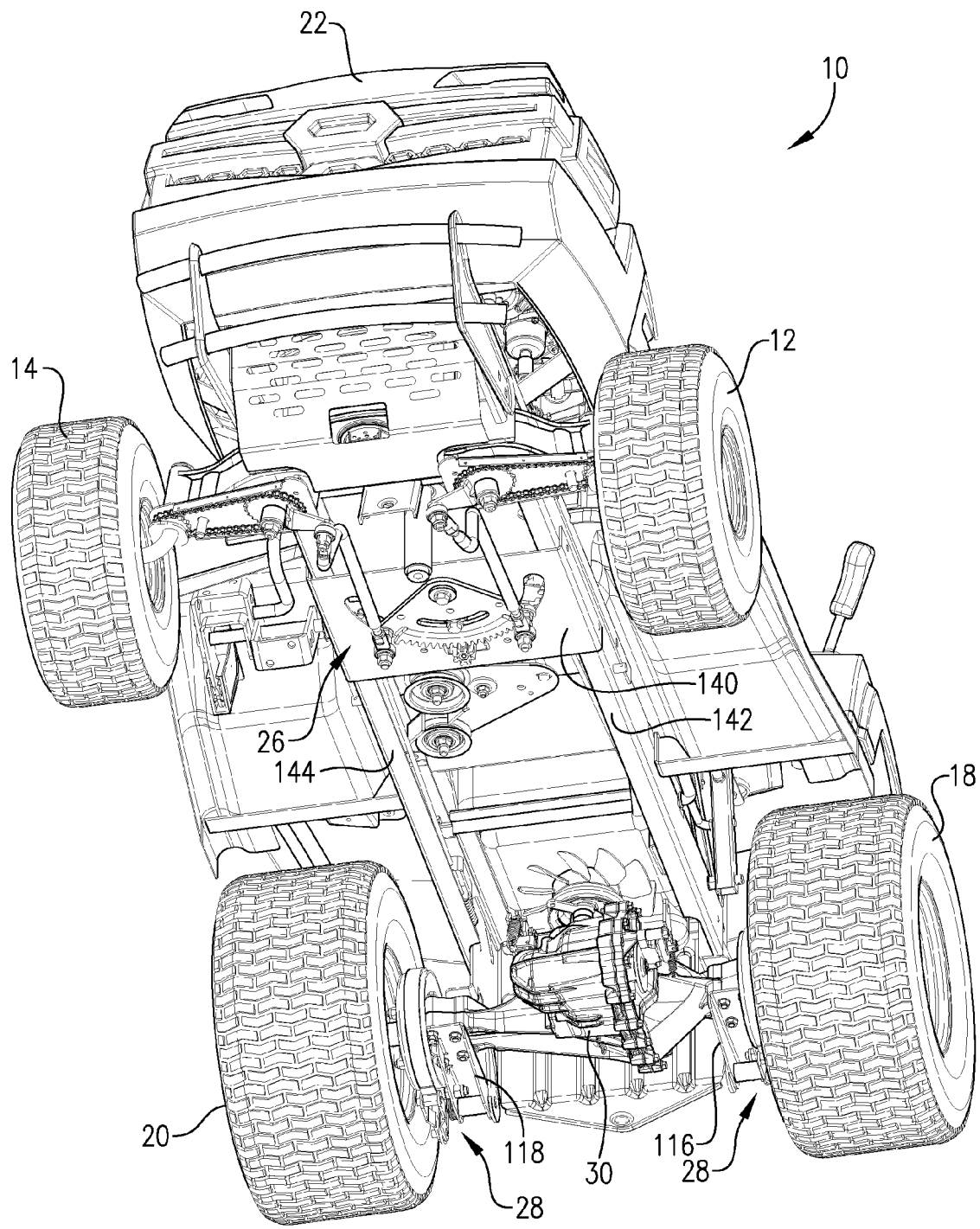
FIG. 2 is a bottom perspective view of the tractor mower of FIG. 1, including a steering system and a rear braking system.

Referring to the drawings, a tractor mower 10 in accordance with embodiments of the present invention is shown in FIGS. 1-2. As used herein, a tractor mower may broadly refer to any type tractor that may be used to perform lawn care and/or yard maintenance, such as may commonly be described as a lawn mower, a lawn tractor, or the like. As shown in FIG. 1, the tractor mower 10 may broadly comprise steerable left and right front wheels 12,14; a steering wheel 16 for controlling steering angles of the left and right front wheels; left and right rear wheels 18,20 (right rear wheel not shown in FIG. 1); an engine housed within an engine compartment 22 for providing power to the left and right rear wheels; and a mower deck 24 that includes one or more blades powered by the engine for cutting grass, turf, or the like. As best shown in FIG. 2, the tractor mower 10 may further comprise a steering system 26 attached to an underside of the tractor mower 10 for directing the front wheels 12,14 in response to the steering wheel 16 being rotated; an independent rear braking system 28 attached to the underside of the tractor mower and coupled with the steering system, with the braking system operable to independently apply a braking force to each of the left and right rear wheels 18,20; and a differential drive system 30 interposed between the engine and the rear wheels, with the differential drive system operable to provide power from the engine independently to each of the rear wheels, such that the rear wheels can turn independently of one another. When the steering system 26 and the braking system 28 are included with the tractor mower 10, the steering and braking systems operate to permit the tractor mower to turn with an enhanced turning radius, such as a zero magnitude turning radius, in both left and right directions.

As used herein, "front" or "forward" refers to a direction towards the front wheels 12,14, while "rear" or "rearward" refers to a direction towards the rear wheels 18,20. Further, "right" or "right-side" refers to a direction towards the right front and rear wheels 14,20, while "left" or "left-side" refers to a direction towards the left front and rear wheels 12,18.

Figure 3:
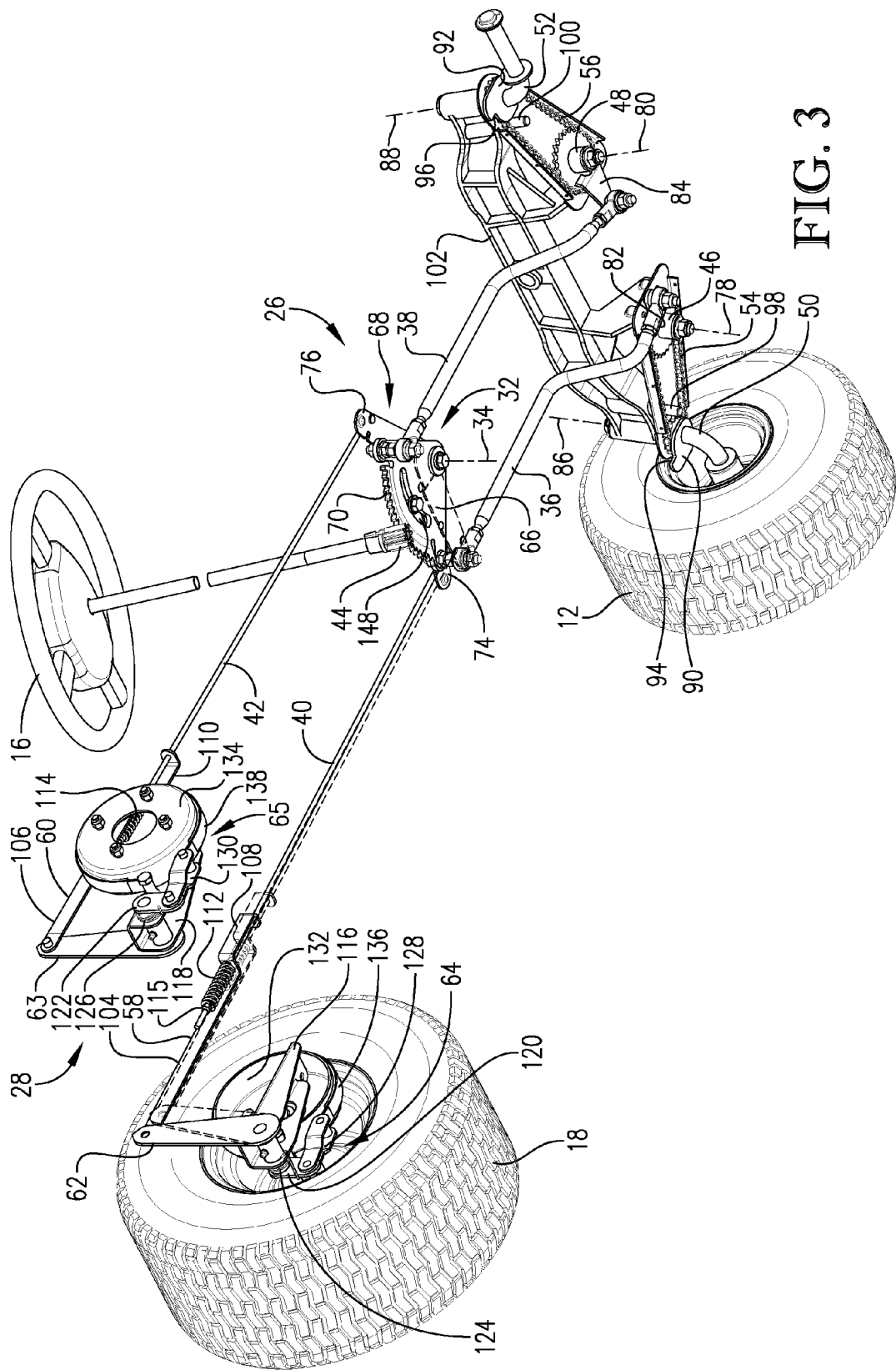
FIG. 3 is a rear, bottom fragmented perspective view of the steering system and rear braking system of FIG. 2, including certain components of the tractor mower of FIGS. 1-2.
Figure 4:
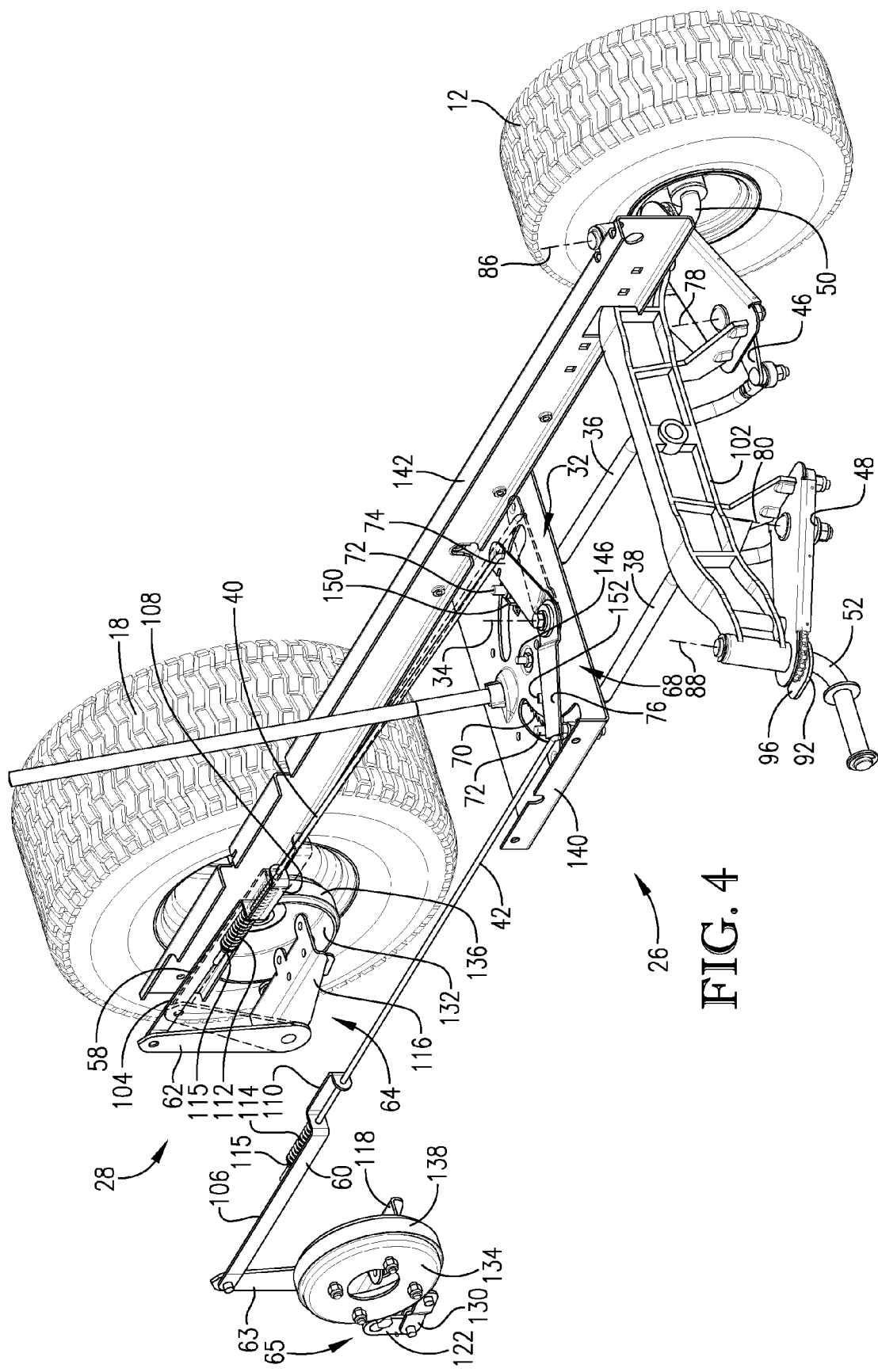
FIG. 4 is a front, top fragmented perspective view of the steering system and rear braking system of FIGS. 2-3, including certain components of the tractor mower of FIGS. 1-2.
Figure 5:
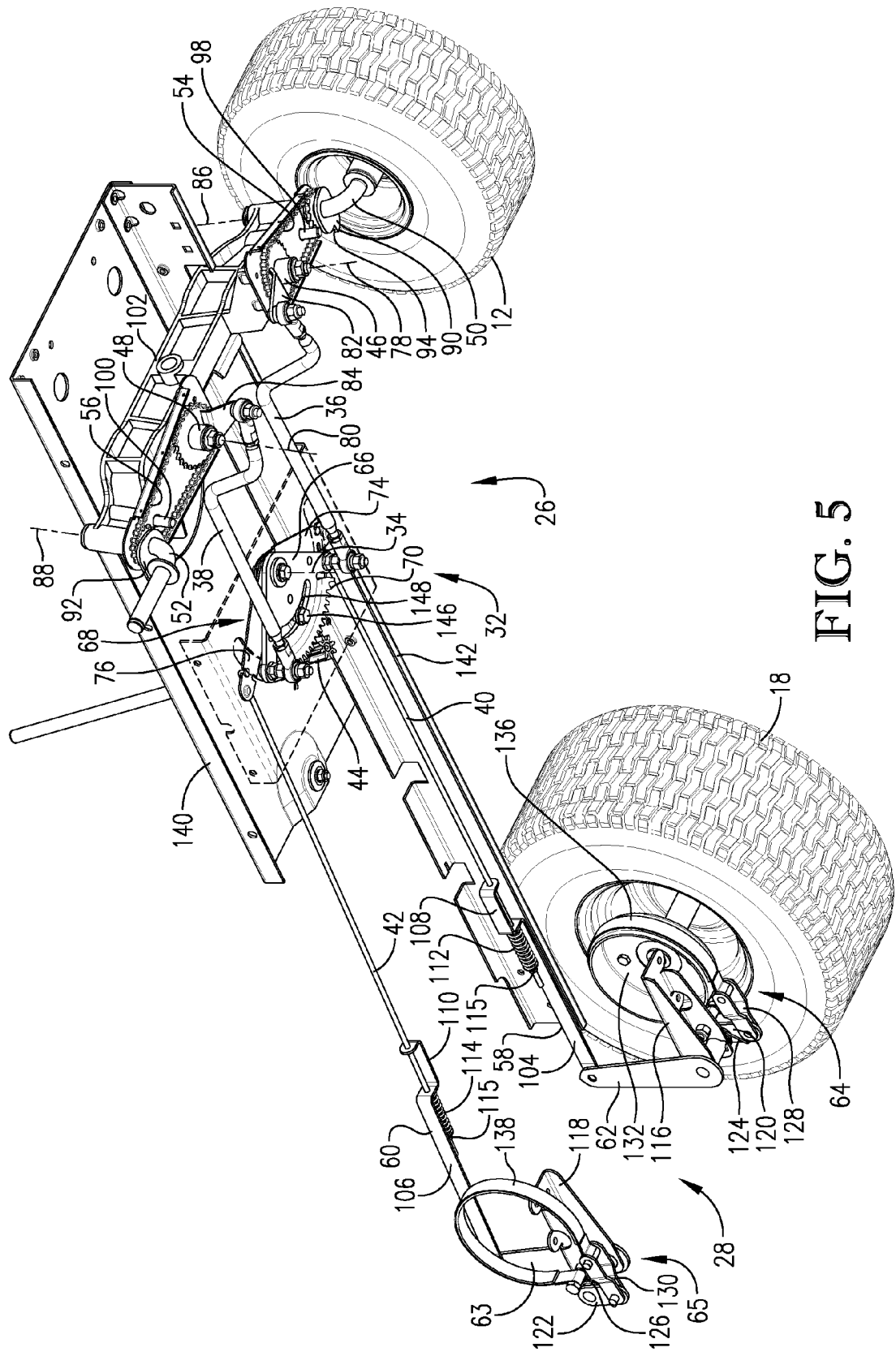
FIG. 5 is a front, bottom fragmented perspective view of the steering system and rear braking system of FIGS. 2-4, including certain components of the tractor mower of FIGS. 1-2.

As illustrated by FIGS. 3-5, the steering system 26 of the tractor mower 10 broadly comprises a central pivot assembly 32 rotatable about a main pivot axis 34; left and right steering rods 36, 38 coupled to and extending generally forward from said central pivot assembly; left and right braking rods 40,42 coupled to and extending generally rearward from said central pivot assembly; a toothed steering gear 44 (not shown in FIG. 4) that is engaged with the central pivot assembly and that is configured to be rotated by the steering wheel 16 (not shown in FIGS. 4-5); rotatable left and right intermediate pivot members 46,48 coupled to the left and right steering rods respectively; rotatable left and right outer pivot members 50,52 coupled to the left and right front wheels 12,14 respectively (right front wheel 14 not shown); and left and right rotation transfer member 54,56 (not shown in FIG. 4) that link rotation of the left and right intermediate pivot members with the left and right outer pivot members respectively. In certain embodiments, the steering wheel 16 of the tractor mower 10 may also be included as part of the steering system 26.

Also with reference to FIGS. 3-5, the independent rear braking system 28 of the tractor mower 10 may broadly comprise left and right tension assemblies 58,60 connected the left and right braking rods 40,42 respectively; left and right brake application members 62,63 connected to the left and right tension assemblies respectively; and left and right brake application assemblies 64,65 coupled with the left and right brake application members and operable to apply a braking force to the left and right rear wheels 18,20 respectively (right rear wheel not shown).

Returning to the steering system 26 and remaining with reference to FIGS. 3-5, the central pivot assembly 32 includes a steering member 66 (not shown in FIG. 4) and a braking assembly 68, both of which are rotatable around the main pivot axis 34. The steering member 66 may be formed in a triangular shape, such as illustrated in the drawings. However, in additional embodiments the steering member may be circular, oval, oblong, or any other shape that operates according to embodiments of the present invention. In embodiments where the steering member 66 is generally triangular, the steering member may have the form of an isosceles triangle, with a base section located rearward and two equal sides that extend from a vertex angle of the triangle (near a forwardmost location) and join with left and right ends of the base section respectively. As shown in the drawings, in such embodiments, the main pivot axis 34 is generally positioned near the vertex angle. Further, the left and right steering rods 36,38 are coupled to the steering member 66 at locations spaced to the left and right of the main pivot axis 34 respectively, and in certain embodiments may be pivotally coupled to the steering member generally near the left and right ends respectively of the base section of the steering member. The left and right steering rods 36,38 may be pivotally coupled with the steering member 66 via nut bolt combinations that may include for instance, ball bearing assemblies, grease bearing assemblies, or locking nut assemblies. Embodiments of the present invention may include other methods of pivotally securing the left and right steering rods 36,38 with the steering member 66, such that the steering rods and steering member are permitted to rotate with respect with each other, while maintaining a secure coupling.

In certain embodiments, such as illustrated in FIGS. 3-5, the base section of the steering member 66 may be formed as a toothed section 70. In such embodiments, the toothed section 70 may be formed to mate with the toothed steering gear 44. In certain embodiments, the toothed section 70 of the steering member 66 may be arcuate shaped. In such embodiments, the toothed section 70 may have a radius of curvature that is at least 2 times greater than a radius of curvature of the toothed steering gear 44. In certain other embodiments, the toothed section's 70 radius of curvature may be between approximately 4, 6, 8, or 10 times greater than the toothed steering gear's 44 radius of curvature. As best illustrated by FIG. 4, the steering member 66 may additionally include one or more engagement projections 72 that extend upward from the steering member. In certain embodiments, the steering member 66 may include two engagement projections 72 that extend upward from the steering member generally from the left and right ends of the base section of the steering member where the left and right steering rods 36,38 are coupled respectively to the steering member.

Remaining with FIGS. 3-5, the braking assembly 68 of the central pivot assembly 32 may broadly comprise left and right pivoting brake members 74,76. In certain embodiments of the present invention, the left and right pivoting brake members 74,76 may rotate independently of one another with respect to the main pivot axis 34. Further, forward ends of the left and right braking rods 40,42 may be directly coupled to the braking assembly 68 at locations spaced to the left and right of the main pivot axis 34 respectively, and in certain embodiments, the left and right braking rods 40,42 may be pivotally coupled to the left and right pivoting brake members 74,76 respectively. The left and right braking rods 40,42 may be pivotally coupled with the left and right pivoting brake members 74,76 via any method of rotatable securitization, such that the braking rods and pivoting brake members are permitted to rotate with respect to each other while maintaining a secure coupling. For instance, as shown in FIGS. 3-5, the left and right pivoting brake members 74,76 may include notches formed in their forward sides, such that the forward ends of the left and right brake rods 40,42 respectively can fit within the notches and can thus be pivotally coupled with the left and right pivoting brake members. However, other methods of pivotal securitization may be used, such as nut bolt combinations that include for instance, ball bearing assemblies, grease bearing assemblies, locking nut assemblies, or the like.

Remaining with the steering system 26 and as best illustrated by FIGS. 3 and 5, the left and right intermediate pivot members 46,48 are rotatable around left and right intermediate axes of rotation 78,80 respectively. The left and right intermediate pivot members 46,48 comprise left and right lever arms 82,84 that extend from the axes of rotation 78,80 respectively. The left and right steering rods 36,38 are coupled to the left and right lever arms 82,84 at respective left and right steering rod connection locations spaced from the axes of rotation 78,80 of said left and right intermediate pivot members 46,48 respectively.

The left and right outer pivot members 50,52, which are coupled with the left and right front wheels 12,14 respectively, are rotatable around left and right outer axes of rotation 86,88 respectively. The left and right outer pivot members 50,52 may include left and right stop engagement members 90,92 respectively. The left and right stop engagement members may generally be circular, rectangular, or square shaped and, as best illustrated by FIG. 3, include left and right stop engaging lips 94,96 respectively.

The left and right intermediate pivot members 46,48 are rotatably linked with left and right outer pivot members 50,52 respectively via the left and right rotation transfer members 54,56. For instance, by way of the left rotation transfer member 54, a rotation of the left intermediate pivot member 46 causes a corresponding rotation in the left outer pivot member 50. Similarly, by way of the right rotation transfer member 56, a rotation of the right intermediate pivot member 48 causes a corresponding rotation in the right outer pivot member 52. In certain embodiments, the left and right intermediate and outer pivot members 46,48,50,52 may each include a sprocket, and the left and right rotation transfer members 54,56 may comprise a chain. Thus, the teeth of the sprockets are operable to engage with the chains, such that rotation of a sprocket causes a corresponding rotation in an adjacent sprocket that is linked via the chain. However, in other embodiments of the present invention, gears, pulleys, cables, belts, and/or other similar devices may be used in place of sprockets and chains.

In certain embodiments and as illustrated in FIGS. 3 and 5, the steering system 26 may further include left and right stop projections 98,100 that extend down from the tractor mower 10, or a front frame cross member 102 of the tractor mower, near the left and right outer pivot members 50,52 respectively. The left and right stop projections 98,100 are operable to engage with the left and right stop engaging lips 94,96 of the left and right stop engagement members 90,92, when a rotation of the left and right outer pivot members 50,52 (and thus left and right front wheels 12,14) have respectively reached a maximum rotation in a given direction. For instance, as best visualized with respect to FIG. 3, as the left outer pivot member 52, and thus the left front wheel 12, is turned to the left, the left engaging lip 94 will begin to rotate towards the left stop projection 98. The left outer pivot member 52 is free to rotate until the left engaging lip 94 engages with the left stop projection 98 and is restricted from rotating further. A maximum range of rotation of the left and right outer pivot members 50,52 in a given direction is dependent on the position of the left and right stop engaging lips 94,96 and the locations of the left and right stop projections 98,100 respectively. In certain embodiments, such as illustrated in FIGS. 3 and 4, the maximum range of rotation may be approximately 90 degrees, such that the left front wheel 12 is restricted from turning to the left more than 90 degrees and the right front wheel 14 is restricted from turning to the right more than 90 degrees. However, embodiments of the present invention may provide for any (or no) restriction on the maximum range of rotation.

As previously described, the left and right steering rods 36,38 generally extend forward from the steering member 66, such that forward ends of the left and right steering rods 36,38 pivotally couple with the left and right intermediate pivot members 46,48 at the left and right lever arms 82,84 respectively. In certain embodiments, the left and right steering rods 36,38 may be straight members, such that the left and right steering rods connect the steering member 66 with the left and right intermediate pivot members 46,48 in generally a linear fashion. However, in other embodiments, such as illustrated in FIGS. 3-5, forward sections of each of the left and right steering rods 36,38 may include one or more angular sections, such that the left and right steering rods extend forward from the steering member 66 in a linear fashion but as they near the left and right intermediate pivot members 46,48 respectively, at least a portion of the left and right steering rods extend downward until they are coupled with the left and right intermediate pivot members respectively. Such embodiments may provide an enhanced ground clearance for the tractor mower 10 and may further provide for clearance for rotation of the left and right front wheels 12,14. The left and right steering rods 36,38 may be pivotally coupled with the left and right intermediate pivot members 46,48 at the left and right steering rod connection locations via nut bolt combinations that may include for instance, ball bearing assemblies, grease bearing assemblies, or locking nut assemblies. Embodiments of the present invention may include other methods of pivotally securing the left and right steering rods 36,38 with the left and right intermediate pivot members 46,48 respectively, such that the left and right steering rods and left and right intermediate pivot members are permitted to respectively rotate while maintaining a secure coupling.

Turning to the rear brake system 28 of the tractor mower 10 and with reference to FIGS. 3-5, the left and right tension assemblies 58,60 are coupled with rearward portions of the left and right braking rods 40,42 respectively. The left and right tension assemblies 58,60 include left and right rigid sections 104,106 at rearward portions of the respective tension assemblies; left and right channel-shaped sections 108, 110 at forward portions of the respective tension assemblies; and left and right bias springs 112,114 positioned rearward of the left and right channel-shaped sections respectively. As illustrated by FIGS. 3-5, the rearward ends of the left and right brake rods 40,42 pass through the left and right channel-shaped portions 108,110 and the left and right bias springs 112,114 of the left and right tension assemblies 58,60 respectively. The rearward ends of the left and right brake rods 40,42 may be threaded, such that locking nuts 115 can be threaded onto each of the brake rods to secure them to the left and right tension assemblies 58,60 respectively.

Top ends of the left and right brake application members 62,63 may be pivotally coupled with rearward sections of the left and right tension assemblies 58,60 respectively. Bottom ends of the left and right brake application members 62,63 may be securely coupled with the left and right brake application assemblies 64,65 respectively. The left and right brake application assemblies 64,65 broadly comprise left and right base brackets 116,118 for supporting components of the respective assemblies; left and right brake levers 120,122 (left brake lever not shown in FIG. 4) coupled with the left and right brake application members 62,63 respectively; left and right return springs 124,126 (not shown in FIG. 4) engaged with the left and right brake levers and operable to force the brake levers in a forward position; left and right brake application brackets 128,130 (left brake application bracket not shown in FIG. 4); left and right brake drums 132,134 (right brake drum not shown in FIG. 5) coupled with the left and right rear wheels 18,20 (right rear wheel not shown in FIGS. 3-5) respectively; and left and right brake straps 136,138 surrounding the left and right brake drums 132,134 and having ends coupled with each of the left and right base brackets and left and right brake application brackets respectively. As will be discussed in more detail below, the left and right brake application assemblies 64,65 are operable to apply a braking force to the left and right rear wheels 18,20 respectively. For example, as the steering member 66 is rotated to the left, one of the engagement projections 72 will engage with the left pivoting brake member 74, forcing the left pivoting brake member, the left brake rod 40, and the left tension assembly 58 forward. As the left tension assembly 58 is pulled forward by the left braking rod 40, the left brake application member 62 is correspondingly forced forward. Forward translation and rotation of the left brake application member 62 causes a corresponding rotation in the left brake lever 120 in a rearward direction, which forces the left brake application bracket 128 rearward. By forcing the left brake application bracket 128 rearward, the left brake strap 136 is drawn tight around the left brake drum 132, thus applying a braking force to the left rear wheel 18. As the steering member 66 returns to the center position, the engagement projection 72 will disengage from the left pivoting brake member 74. The left bias spring 112 will provide a return force, causing the pivoting brake member 74, the left brake rod 40, and the left tension assembly 58 to each return to their natural positions. As the left tension assembly 58 returns to a natural rearward position, the left return spring 124 causes the left brake lever 120 to move back to a natural forward position, thus releasing the restriction of the left brake strap 136 on the left brake drum 132 and removing the braking force being applied to the left rear wheel 18. It is understood that a similar process may be incorporated by the right brake rod 42, the right tension assembly 60, and the right brake application assembly 65 to apply a braking force to the right rear wheel 20.

In certain embodiments, the steering system 26 and the rear braking system 28 may be coupled directly to an underside of the tractor mower 10 to secure the systems in place. For example, as best illustrated by FIG. 2, the braking system 28 may be secured to the tractor mower 10 by having each of the left and right base brackets 116,118 of the left and right brake application assemblies 64,65 coupled directly to left and right sides of the differential drive system 30 respectively. The base brackets 116,118 may be secured to the differential drive system 30 by nut and bolt combinations or the like. As best illustrated by FIGS. 3-5, certain forward positioned components of the steering system 26 may be coupled directly to the front frame cross member 102. For instance, each of the left and right intermediate pivot members 46,48, the left and right outer pivot members 50,52, and the left and right stop projections 98,100 may be coupled to an underside of the front frame cross member 102.

As best illustrated by FIGS. 2 and 4-5, portions of the central pivot assembly 32 of the steering system 26 may also be coupled to the tractor mower 10. In certain embodiments, portions of the central pivot assembly 32 may be indirectly coupled with the underside of the tractor mower 10 via a plate bracket 140 that has sides that are securely coupled with left and right side frame rails 142,144 of the tractor mower (right side rail not shown in FIGS. 4-5). As best illustrated by FIGS. 4-5, the central pivot assembly 32 may be coupled to the plate bracket 140 through a nut and bolt combination located at the main pivot axis 34. In such embodiments, the steering member 66 of the central pivot assembly 32 may be located below the plate bracket 140, while the braking assembly 68 is located above the plate bracket. The steering member 66 of the central pivot assembly 32 may also be coupled with the plate bracket 140 with a stationary nut and bolt combination 146 that secures a rearward portion of the steering member to the plate bracket. Because the steering member 66 is free to rotate about the main pivot axis 34, the steering member is configured to translate about the stationary nut and bolt combination 146, while still being secured to the plate bracket 140. To accomplish such translation and as best illustrated by FIGS. 3 and 5, the steering member 66 may include an extended opening 148 located forward of the toothed section 70. The extended opening 148 may have a shape that corresponds with the toothed section 70, such that a radius of curvature of the extended opening may correspond with the radius of curvature of the toothed section. In additional embodiments and as illustrated in FIG. 4, the plate bracket 140 may include left and right brake member biasing projections 150,152 that are operable to engage, in certain instances, with the left and right pivoting brake members 74,76 respectively, such that the left and right braking members are restricted from rotating too far in a rearward direction.

Figure 6A:
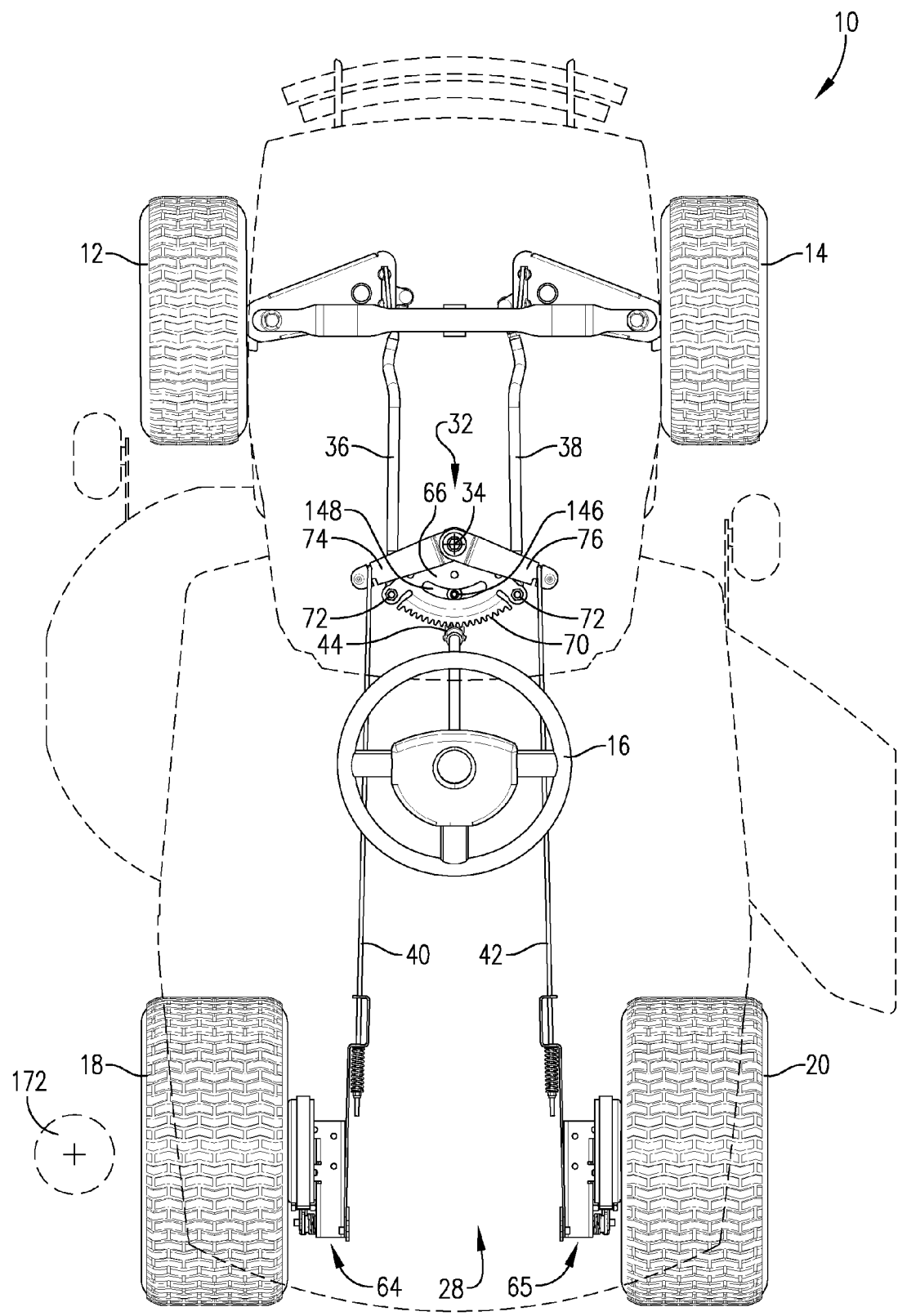
FIG. 6a is top view of the steering system and braking system of FIG. 1-5 operating to steer the tractor mower from FIGS. 1-2 in a straight direction, with portions of the tractor mower in phantom.
Figure 6B:
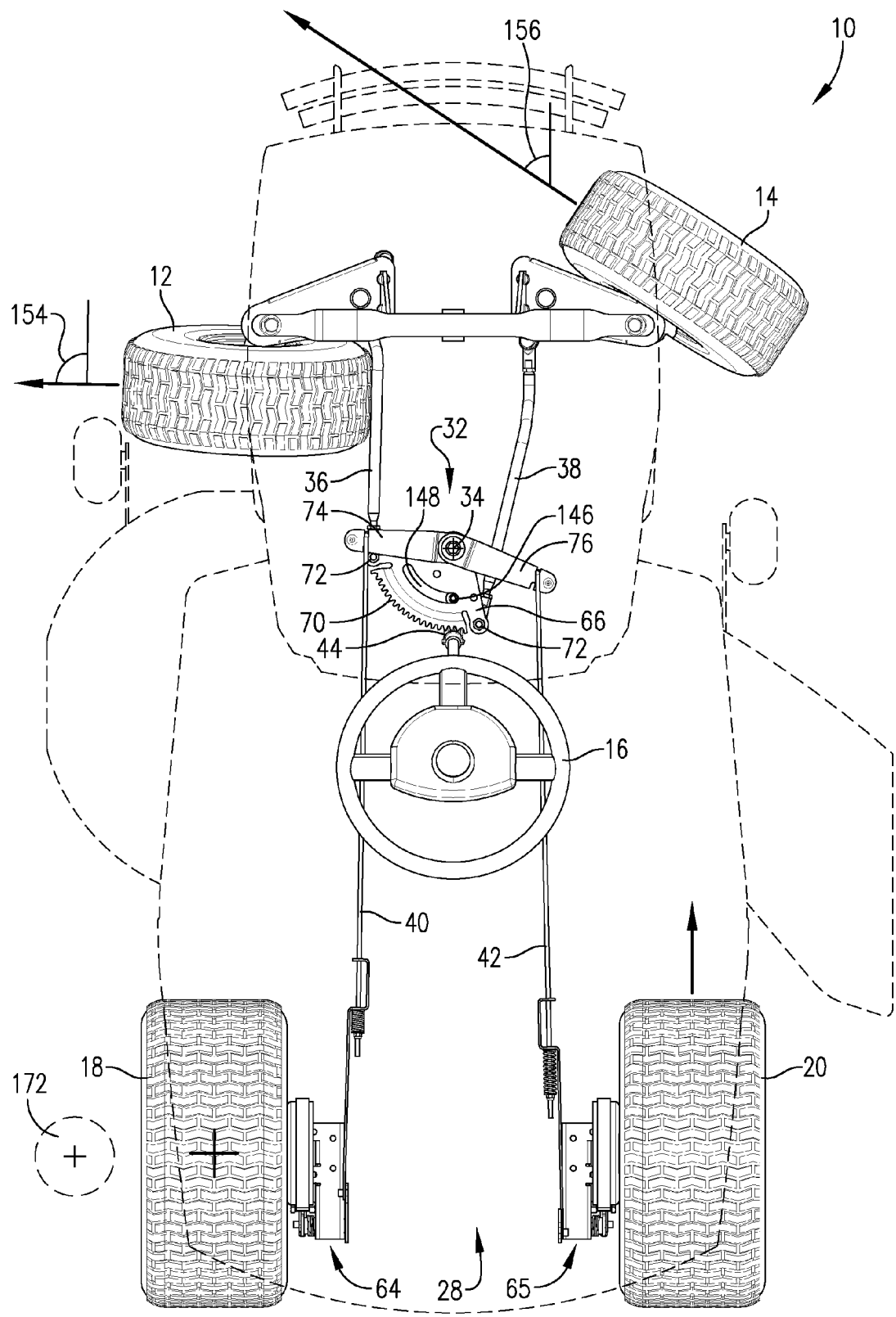
FIG. 6b is top view of the steering system and braking system of FIGS. 1-5 and 6a operating to steer the tractor mower from FIGS. 1-2 and 6a in a left direction, with portions of the tractor mower in phantom.
Figure 6C:
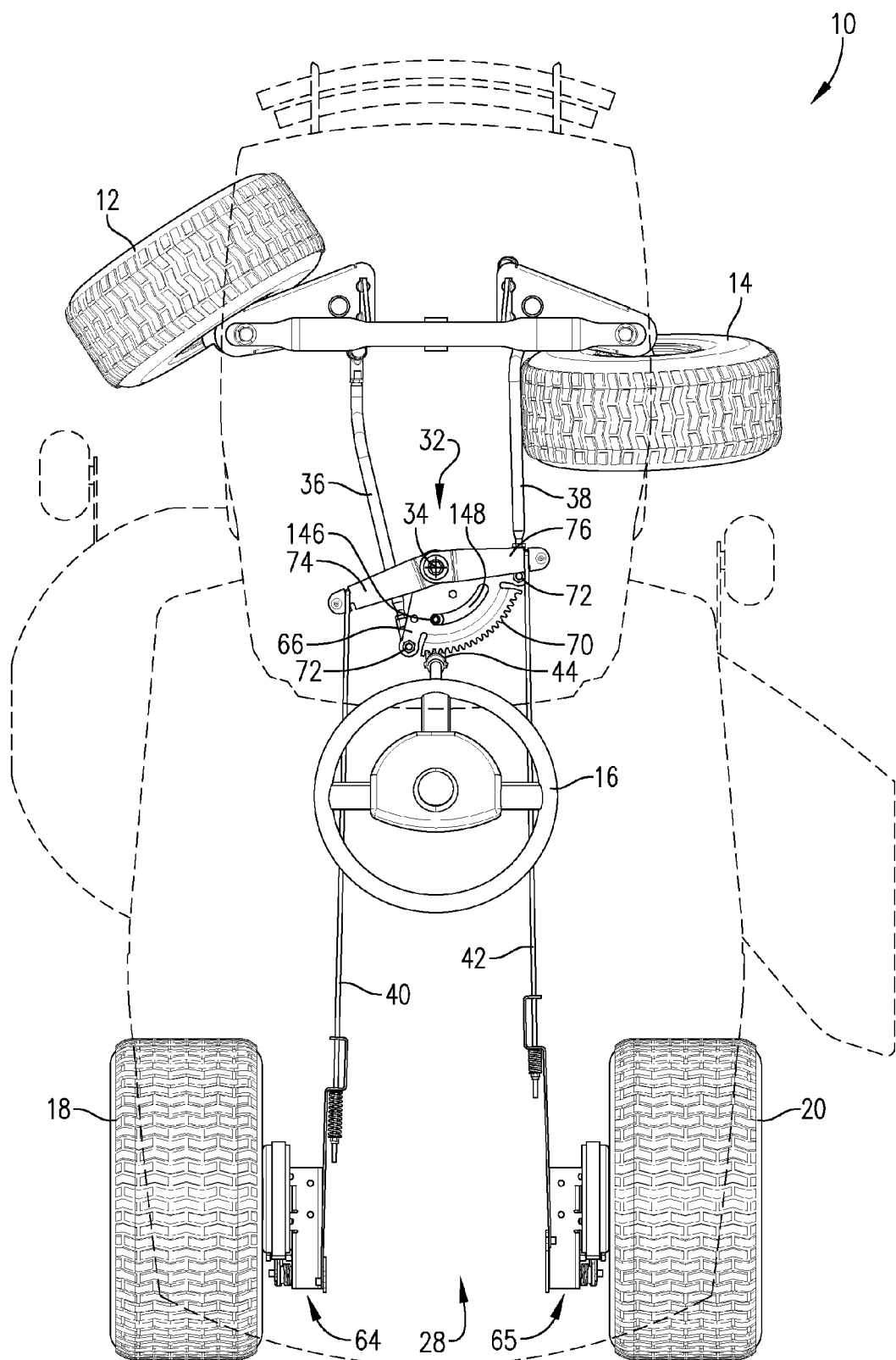
FIG. 6c is top view of the steering system and braking system of FIGS. 1-5 and 6a-6b operating to steer the tractor mower from FIGS. 1-2 in a right direction, with portions of the tractor mower in phantom.

In operation, the steering and braking systems 26,28 are broadly configured to steer the tractor mower 10 in left and right directions. As best illustrated by FIGS. 6a-6c, starting from a center position (i.e., FIG. 6a), when the steering wheel 16 is turned in a counter-clockwise direction, the toothed steering gear 44 rotates counter-clockwise and causes the toothed section 70 of the steering member 66 to correspondingly translate to the left, such that the steering member rotates in a clockwise direction about the main pivot axis 34. Thus, as should be apparent, the rotation of the steering member 66 is generally in an opposite direction from that of the steering wheel 16 and/or the toothed steering gear 44. As shown in FIG. 6b, such a clockwise rotation by the steering member 66 causes the left and right steering rods 36,38 to move forward and rearward respectively, thus resulting in a corresponding left turn rotation by the left and right front wheels 12,14. Simultaneously, the rotation by the steering member 64 may cause the left braking member 74 to move forward, resulting in a corresponding forward movement of the left braking rod 40. If the left braking member 74 is moved forward, the left brake application assembly 64 will apply a braking force to the left rear wheel 18. Alternatively, as illustrated by FIG. 6c, if the steering wheel 16 is turned in a clockwise rotation, the toothed steering gear 44 rotates clockwise and causes the toothed section 70 of the steering member 66 to correspondingly translate to the right, such that the steering member rotates in a counter-clockwise direction about the main pivot axis 34. Such a rotation by the steering member 66 causes the left and right steering rods 36,38 to move rearward and forward respectively, thus resulting in a corresponding right turn rotation by the left and right front wheels 12,14. Simultaneously, the rotation by the steering member 66 may cause the right braking member 76 to move forward, resulting in a corresponding forward movement of the right braking rod 42. If right braking member 76 moves forward, the right brake application assembly 65 will apply a braking force to the right rear wheel 20.

In more detail, FIG. 6a illustrates the steering member 66 of the central pivot assembly 32 in a center position, such that the steering member is not rotated about the main pivot axis 34 in either the right or left direction. The center position may be identified when the toothed steering gear 44 is positioned generally in a center of the toothed section 70 of the steering member 66, such that the toothed steering gear is equally spaced from the left and right ends of the base section of the steering member. With the steering member 66 in the center position, the steering system 26 is similarly referred to be in a center position. As is also indicated by FIG. 6a, when the steering system 26 and steering member 66 are in the center position, the left and right front wheels 12,14 exhibit a steering angle of approximately zero, such that if the tractor mower 10 is in motion, the tractor mower will not turn but will travel in a straight direction.

The steering member 66 is configured to rotate about the main pivot axis 34 between a left-most position and a right-most position. With the steering member 66 in the left-most position, the steering system 26 is similarly referred to be in a left full steering position, and with the steering member 66 in the right-most position, the steering system is similarly referred to be in a right full steering position. FIG. 6b is illustrative of the steering member 66 in the left-most position, while FIG. 6c is illustrative of the steering member in the right-most position. Constraints on a distance the steering member 66 rotates between the left and right-most positions is generally dependent on a length of the extended opening 148 of the steering member. As the steering member 66 reaches the left and/or right-most position, the stationary nut and bolt combination 146 of the plate bracket 140 (not shown) engages with right or left ends of the extended opening 148 respectively, thus restricting the steering member 66 from rotating further. In certain embodiments, the difference between the left-most position and the right-most position of the steering member 66 is at least 30 degrees, 45 degrees, 60 degrees, 75 degrees, or 80 degrees and/or not more than 180 degrees, 120 degrees, 110 degrees, or 100 degrees. However, embodiments may include any radial difference between left and right-most positions, as may be required for specific implementations of embodiments of the present invention.

As illustrated by FIGS. 6b and 6c, the rotation of the steering member 66 between the left and right-most positions causes the left and right front wheels 12,14 each to steer between left full steering angles and right full steering angles. As will be discussed in more detail below, the steering system 26 of embodiments of the present invention cause the left and right front wheels 12,14 to turn at different steering angles, such that the left full steering angle for the left front wheel 12 is different from the left full steering angle for the right front wheel 14, and similarly for the right full steering angles. For example, FIG. 6b shows the left front wheel's 12 left full steering angle 154 that is greater than the right front wheel's 14 left full steering angle 156.

Figure 7:
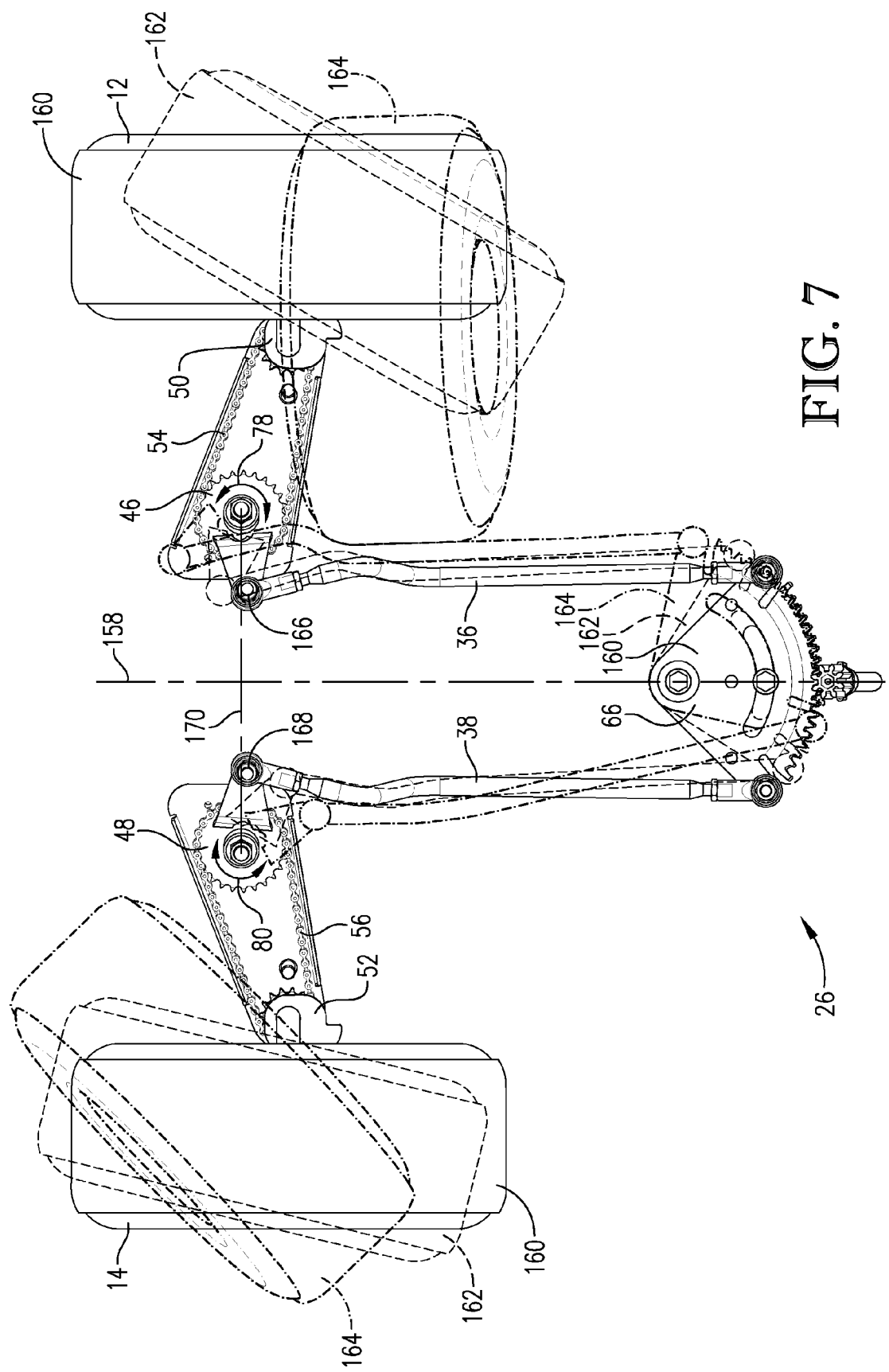
FIG. 7 is a bottom view of the steering system of FIGS. 1-5 and 6a-6c operating to steer front wheels of the tractor mower from FIGS. 1-2 in three directions, with two of the directions illustrated in phantom.

For an additional example, FIG. 7 illustrates portions of the steering system 26 and left and right front wheels 12,14 in three different angles. FIG. 7 also includes a centerline 158 that bisects a length of the tractor mower 10. In a first position 160, the steering member 66 is in the center position, such that the left and front wheels 12,14 each have a steering angle of approximately zero. In a second position 162, the steering member 66 is in a left intermediate steering position, such that the left front wheel 12 is turned to a left intermediate steering angle, while the right front wheel 14 is turned to left intermediate steering angle that is generally less than the left wheel's left intermediate steering angle. In a third position 164, the steering member 66 is in the left-most steering position, such that the left front wheel 12 is turned to the left full steering angle (i.e., steering angle 154 from FIG. 6b), while the right front wheel 14 is turned to a left full steering angle (i.e., steering angle 156 from FIG. 6b) that is generally less than the left full steering angle of the left front wheel 12. Although FIG. 7 only illustrates positions that turn the steering member 66 and the front wheels 12,14 to the left, it is understood that embodiments of the present invention similarly provide for corresponding turns to the right. For example, if the steering member 66 is rotated to the right-most steering position, the front right wheel 14 may be turned to a right full steering angle, while the left front wheel 12 is turned to a left full steering angle that is generally less than the left full steering angle of the right front wheel 14.

The differences between the steering angles of the left and right front wheels 12,14 is due, in part, to how the steering member 66 causes the left and right steering rods 36,38 to translate. For example, as illustrated by FIG. 7, as the steering member 66 is rotated to the left, the left steering rod 36 is forced forward, thus causing rotation of the left intermediate pivot member 46, the left rotation transfer member 54, the left outer pivot member 50, and finally the left front wheel 12. As can be seen from FIG. 7, a majority of the movement of the left steering rod 36 is in the forward direction, with little translation to the right or left. Thus, most of the movement of the left steering rod 36 is imparted to the rotation of the left outer pivot member 50 and to the left front wheel 12. Simultaneously, the right steering rod 38 is forced rearward, thus causing rotation of the right intermediate pivot member 48, the right rotation transfer member 56, the right outer pivot member 52, and finally the right front wheel 14. However, a significant portion of the right steering rod's 38 movement includes a translation towards the centerline 158. Thus, less of the steering rod's 36 movement is imparted to the right intermediate pivot member 48 and to the right front wheel 14. As a result, the left front wheel 12 will have a greater steering angle than the right front wheel 14 as the steering member 66 is rotated to the left. Although not shown in FIG. 7, similar differences in steering angles between the left and right front wheels 12,14 result when the steering member 66 is rotated right.

The differences between the steering angles of the left and right front wheels 12,14 may also be due, in part, to how the left and right steering rods 36,38 are coupled to the left and right intermediate pivot members 46,48. As previously described and as further illustrated in FIG. 7, the left and right steering rods 36,38 are coupled to the left and right intermediate pivot members 46,48 at left and right steering rod connection locations 166,168 that are spaced from the respective intermediate pivot axes 78,80 of the left and right intermediate pivot members. When the steering member 66 is in a center position, such that the left and right front wheels 12,14 are positioned for straight forward travel, the left and right steering rod connection locations 166,168 are not aligned with a transverse steering axis 170 extending between the intermediate pivot axes 78,80 of the left and right intermediate pivot members 46,48. The transverse steering axis 170 extends between the left and right intermediate pivot axes 78,80 and intersections perpendicularly with the centerline 158. When the steering member 66 is in the center position, the left and right steering rod connection locations 166,168 are positioned generally rearward of the transverse steering axis 170, with the left steering rod connection location spaced to the right of the left intermediate pivot axis 78 and the right steering rod connection location spaced to the left of the right intermediate pivot axis 80. In such positions, the left and right steering rod connection locations 166,168 may form left and right skew angles respectively with the transverse steering axis 170. When the steering member 66 is in the center position, the left and right skew angles may be at least approximately 5 degrees, 10 degrees, or 15 degrees, and may not be more than approximately 45 degrees, 35 degrees, or 30 degrees. However, when the steering member 66 is in a left-most steering position, the left steering rod connection location 166 is forward of the transverse steering axis 170, and the right steering rod connection location 168 is rearward of the transverse steering axis. Alternatively, when the steering member 66 is in a right-most steering position, the right steering rod connection location 168 is forward of the transverse steering axis 170, and the left steering rod connection location 166 is rearward of the transverse steering axis. For example and with reference to FIG. 7, when the steering member 66 is in a center position (i.e., first position 160), the left and right steering rod connection locations 166,168 are each rearward of the transverse steering axis. However, when the steering member 66 is in a left-most steering position (i.e., third position 164), the left steering rod connection location 166 is forward of the transverse steering axis 170, while the right steering rod connection location 168 is rearward of the transverse steering axis.

Therefore, the steering system 26 is configured to steer said left and right front wheels 12,14 between a left full steering position and a right full steering position. With reference to FIG. 6b, in the left full steering position, embodiments of the present invention provide for the left front wheel 12 to have a left full steering angle 154 of at least 75 degrees, at least 80 degrees, at least 85 degrees, or about 90 degrees when the steering member 66 is in a left-most steering position. Additionally, when the left front wheel 12 is at a left full steering angle, the difference between such left full steering angle and the right wheel's 14 left full steering angle 156 may be at least 5 degrees, 10 degrees, 15 degrees, or 20 degrees and/or not more than 50 degrees, 40 degrees, 35 degrees, or 30 degrees. With reference to FIG. 6c, which illustrated the steering system 26 in a right full steering position, embodiments provide for the right front wheel 14 to have a right full steering angle of at least 75 degrees, at least 80 degrees, at least 85 degrees, or about 90 degrees when the steering member 66 is in a right-most steering position. Additionally, when the right front wheel 14 is at a right full steering angle, the difference between such right full steering angle and the left wheel's 12 right full steering angle may be at least 5 degrees, 10 degrees, 15 degrees, or 20 degrees and/or not more than 50 degrees, 40 degrees, 35 degrees, or 30 degrees.

In certain embodiments the difference between the steering angles of the front wheels 18,20 may also be constrained by size specifications of the tractor mower 10. For example, in certain embodiments, as the left front wheel 12 is at left full steering angle 154, the left full steering angle 156 of the right front wheel 14 may be determined by calculating the arctangent of a ratio of a wheel base of the tractor mower 10 and a track distance of the tractor mower. In such embodiments, the wheel base is defined by a distance from centers of the front wheels 12,14 to centers of the rear wheels 18, 20, and the track distance is defined by a distance from the centers of the left front and rear wheels 12,18 to the centers of the right front and rear wheels 14,20. Similarly, in such embodiments, as the right front wheel 14 is at the right full steering angle, the left full steering angle of the left front wheel 12 will be equal to the arctangent of the ratio of the wheel base and the track distance.

In addition to steering the front wheels, the steering system 26 of the tractor mower 10 operates to control the rear braking system 28, such that the rear braking system can independently apply a braking force to each of the left and right rear wheels 18,20. In more detail and as best illustrated by FIGS. 6a-6c, as the steering member 66 is rotated to the left (i.e., FIG. 6b), one of the engagement projections 72 engages the left pivoting brake member 74, forcing the left pivoting brake member forward as it rotates around the main pivot axis 34. The forward movement of the left pivoting brake member 74 forces the left braking rod 40 forward, and causes the rear braking system 28 to apply a braking force to the left rear wheel 18, as previously described. Similarly as the steering member 66 is rotated the right (i.e., FIG. 6c), one of the engagement projections 72 engages the right pivoting brake member 76, forcing the right pivoting brake member forward as it rotates around the main pivot axis 34. The forward movement of the right pivoting brake member 76 forces the right braking rod 42 forward and causes the rear braking system 28 to apply a braking force to the right rear wheel 20, as previously described. Thus, it is understood that when the steering member 66 is turned to the left, only the left pivoting brake member 74 may rotate about the main pivot axis 30 and only the left rear wheel 18 may have a braking force applied to it. Similarly, when the steering member 66 is turned to the right, only the right pivoting brake member 76 may rotate about the main pivot axis 34 and only the right rear wheel 20 may have a braking force applied to it.

As can be seen from FIG. 6a, when the steering member is in a center position, there is a distance from the engagement projections 72 of the steering member 66 and the left and right pivoting brake members 74,76. Such a distance is maintained due to the left and right brake member biasing projections 150,152 that extend from the plate bracket 140 to engage the left and right pivoting brake members 74,76. Because of the distance between the engagement projections 72 and the left and right pivoting brake members 74,76, there is a range of rotation by the steering member 66 where the left or right pivoting brake members will not be forced forward and rotated around the main pivot axis 34, such that the steering member 66 will only cause the left or right front wheels 12,14 to be turned (due to movement of the left and right steering rods 36,38), but will not cause a braking force to applied to the left or right rear wheels 18,20 (due to lack of movement of the left and/or right braking rods 40,42). As the steering member 66 rotates to the left, such a range of rotation may be referred to as a left steering only range of rotation. As the steering member 66 rotates to the right, such a range of rotating may be referred to as a right steering only range of rotation.

In addition, however, once the steering member 66 has rotated past the left or right steering only ranges of rotation, one of the engagement projections 72 will engage with left or right pivoting brake members 74,76 respectively and will force the pivoting brake member forward as it rotates around the main pivot axis 34. Thus, the steering member 66 will simultaneously cause the left or right front wheels 12,14 to be turned and a corresponding braking force to be applied to either the left or right rear wheel 18,20. For instance, as the steering member 66 rotates to the left, the left and right front wheels 12,14 will be turned to the left and a braking force will be applied to the left rear wheel 18, such that a range of rotation for the steering member may be referred to as a left steering and braking range of rotation. As the steering member 66 rotates to the right, the left and right front wheels 12,14 will be turned to the right and a braking force will be applied to the right rear wheel 20, such that the range of rotation for the steering member may be referred to as a right steering and braking range of rotation In general, the left and right steering and braking ranges of rotation extend from ends of the left and right steering only ranges of rotation respectively and continue until the steering member 66 is in the left and right-most positions respectively. In certain embodiments, each of the left and right steering only ranges of rotation extend through an angle of at least approximately 5, 10, 15, or 20 degrees, but not more than approximately 90, 60, 50 or 45 degrees. In further embodiments, each of the left and right steering and braking ranges of rotation extend through an angle of at least approximately 5, 10, 15, or 20 degrees, but not more than approximately 90, 60, 50 or 45 degrees.

A magnitude of the braking force applied to either the right or left rear wheels 18,20 via the brake system is dependent on how far the left or right pivoting brake members 74,76 are forced forward and rotated around the main pivot axis 34 by the steering member 66. As previously described, forward rotation of the left and right brake members 74,76 causes a forward movement of the left and right braking rods 40,42 respectively, which results in a braking force being applied to the left and right rear wheels 18,20 respectively via the braking system 28. For example, as the steering member 66 rotates from the center position to the left and begins to enter the left steering and braking range of rotation, the left pivoting brake member 74 will only be rotated forward a small amount, and the left braking rod 40 will only be forced forward a correspondingly small amount. The small forward movement of the left braking rod 40 will cause the left brake strap 136 of the left brake application assembly 64 to tighten around the left brake drum 132 a small amount, thus resulting in a relatively small braking force being applied to the left rear wheel 18. Alternatively, once the steering member 66 has rotated to the left-most position, the left pivoting brake member 74 will be rotated forward a significant amount, and the left braking rod 40 will be forced forward a correspondingly significant amount. The significant forward movement of the left braking rod 40 will cause the left brake strap 136 of the left brake application assembly 64 to tighten around the left brake drum 132 a significant amount, thus resulting in a significant braking force being applied to the left rear wheel 18. Similar magnitudes of braking forces applied to the right rear wheel 20 may likewise be obtained.

The magnitude of the braking force applied to the rear wheels 18,20 may be manipulated by adjusting the locking nuts 115 threaded onto the rearward ends of the left and right braking rods 40,42 respectively. For instance, by threading the locking nuts 115 further towards the forward direction, the left and right tension assemblies 58,60 will be biased in a forward direction, thus causing the left and right brake application members 62,63 to be rotated partially forward. As a result, the left and right brake application members 62,63 will similarly be biased in a forward direction, such that a smaller forward movement of the left and right pivoting brake members 74,76 and the left and right braking rods 40,42 will be required to increase the braking force applied to the left and right rear wheels 18,20 respectively. Similarly, by threading the locking nuts 115 further towards the rearward direction, the left and right tension assemblies 58,60 will be biased in a rearward direction, thus causing the left and right brake application members 62,63 to be rotated rearward. As a result, the left and right brake application members 62,63 will similarly be biased in a rearward direction, such that a larger forward movement of the left and right pivoting brake members 74,76 and the left and right braking rods 40,42 will be required to increase the braking force applied to the left and right rear wheels 18,20 respectively. Thus, the locking nuts 115 can be used to adjust the magnitude of the braking force applied to the rear wheels 18,20 and to affect sizes of the left and right steering and braking ranges of rotation. In certain embodiments, the left and right rigid sections 104,106 of the left and right tension assemblies 58,60 may include a plurality of indicators, such as lines, notches or other markings, which may be used to indicate proper positioning of the locking nuts 115 on the rearward ends of the left and right braking rods 40,42 and the proper compression of the left and right biasing springs 112,114, so as to ensure proper magnitudes of the braking forces to the left and right rear wheels 18,20. In addition, because adjustment of the locking nuts may affect the sizes of the left and right steering and braking ranges of rotation, as previously described, the plurality of indicators may also be used to indicate proper positioning of the locking nuts 115 to ensure proper left and right steering and braking ranges of rotations.

When the tractor mower 10 includes the steering system 26 and rear braking system 28 of embodiments of the present invention, the tractor mower can be steered, such that the left and right front wheels 12,14 are steered left and/or right and no braking force is applied to the left and/or right rear wheels 18,20. Such is accomplished by rotating the steering wheel 16

(and thus steering member 66) from a central position through the left and/or right steering only ranges of rotation. Additionally, the tractor mower can be steered, such that the left and right front wheels 12,14 are steered left and/or right and a braking force is applied to the left and/or right rear wheels 18,20. Such is accomplished by rotating the steering wheel 16 (and thus steering member 66) from the left and/or right steering only ranges of rotation through the left and/or right steering and braking ranges of rotation and to full left and/or right steering positions. Thus, during standard steering requirements, the tractor mower 10 can be maneuvered by causing only the left and right front wheels 12,14 to be steered. Such standard steering requirements may include maneuvering the tractor mower 10 around slight, non-steep curves. However, during maneuvers in which the tractor mower is required to be steered at steep angles, such as may require a zero magnitude turning radius, the left and/or right front wheels are steered while a braking force is applied to either the left or right rear wheels 18,20, as previously described.

In certain embodiments, when the steering wheel causes the left and right front wheels 12,14 to be steered to the left and/or right and no braking force applied to the left and/or right rear wheels 18,20 respectively, the left and right front wheels may travel through a first steering angle range of at least 10, 20, 30, or 40 degrees and/or not more than 90, 85, 75, 65, or 60 degrees. Additionally, when the steering wheel causes the left and right front wheels 12,14 to be steered to the left and/or right and a braking force applied to the left and/or right rear wheels 18,20 respectively, the left and right front wheels may travel through a second steering angle range of at least 10, 20, 30, or 40 degrees and/or not more than 90, 85, 75, 65, or 60 degrees.

As an example of the tractor mower 10 implementing certain steering angles and with reference to FIGS. 6a-6b, if the tractor mower comes upon an object 172, such as a light-pole or a tree extending from the ground, for instance, the steering member 66 can be turned from the central position to a left position by rotating the steering wheel 16 from a central position to a left steering position. As a result, the left front wheel 12 is turned to the left at a left steering angle (i.e., angle 154), and the right front wheel is turned to the left at a left steering angle (i.e., angle 156) that is generally less than the left front wheel's left steering angle. Simultaneously, a braking force is applied only to the left rear wheel 18. Therefore, the tractor mower 10 is operable to make an extremely sharp left turn around the object 172. However, it is understood that in the above example, the tractor mower 10 is not making a left full turn around the object 172. For instance, it is understood that in addition to the extremely sharp turn described above, the steering and braking systems 26,28 enable the tractor mower 10 to make zero magnitude turning radius turns. By turning the steering wheel 16 such that the steering member 66 rotates from the central position to the left-most position, the left front wheel 12 is turned to the left at a left full steering angle, which may be approximately 90 degrees, and the right front wheel 14 is turned to the left at a left full steering angle, which is generally less than 90 degrees. Simultaneously, a significant braking force is applied to the left rear wheel 18, such that the left rear wheel is restricted from rotating about its axis. Thus, the tractor mower 10 will make a zero magnitude turning radius turn to the left by pivoting around the center of the left rear wheel. It is further understood that embodiments of the present invention provide for similar turns to be made in the right direction. Such zero magnitude turning radius turns provide for the tractor mower 10 to change directions without having to make large, unproductive looping turns. As a further example, if the tractor mower 10 is operating in a straight cut path and reaches an end of the cut path, the tractor mower 10 can perform a zero magnitude turning radius turn to the left or right by pivoting 180 degrees around the centers of the left or right rear wheels 18,20 respectively. Thus, the tractor mower 10 can efficiently continue to an adjacent cut path without making an unproductive looping turn.

Although the invention has been described with reference to the exemplary embodiments illustrated in the attached drawings, it is noted that equivalents may be employed and substitutions made herein without departing from the scope of the invention as recited in the claims. For example, the braking system 28 of embodiments of the present invention may alternatively comprise a wet brake incorporated as part of and housed completely inside of the differential drive system 30. Such a wet brake system may be used in place of the brake straps and brake drums discussed above. In such embodiments, the steering system 26 and braking system 28 may include hydraulic connectors and control components as necessary to apply braking forces to the rear wheels.

Having thus described various embodiments of the invention, what is claimed as new and desired to be protected by Letters Patent includes the following:

1. A tractor mower comprising:
steerable left and right front wheels;
left and right rear wheels;
an engine for providing power to drive said rear wheels;
an independent rear braking system capable of applying a braking force to said left and right rear wheels independently of one another; and
a steering system coupled to said front steerable wheels and said independent rear braking system,
wherein said steering system comprises—
a central pivot assembly rotatable about a main pivot axis,
left and right steering rods coupled to and extending generally forward from said central pivot assembly, and
left and right braking rods coupled to and extending generally rearward from said central pivot assembly,
wherein said central pivot assembly comprises a steering member and a braking assembly,
wherein said steering rods are directly coupled to said steering member and said braking rods are directly coupled to said braking assembly,
wherein said steering and braking systems are configured such that when said central pivot assembly is rotated in a first direction said steering rods are utilized to steer said front wheels to the right and said right braking rod is utilized to exert said braking force on said right rear wheel,
wherein said steering and braking systems are configured such that when said central pivot assembly is rotated in a second direction opposite said first direction said steering rods are utilized to steer said front wheels to the left and said left braking rod is utilized to exert said braking force on said left rear wheel.

2. The tractor mower of claim 1, wherein said steering member and said braking assembly are rotatable about said main pivot axis.

3. The tractor mower of claim 1, wherein said braking assembly comprises left and right pivoting brake members wherein said left and right braking rods are coupled to said left and right pivoting brake members respectively.

4. The tractor mower of claim 3, wherein only said right pivoting brake member rotates about said main pivot axis when said steering member is rotated in said first direction and only said left pivoting brake member rotates about said pivot main axis when said steering member is rotated in said second direction.

5. The tractor mower of claim 3, wherein said steering member is configured to rotate on said main pivot axis between a left-most steering position and a right-most position.

6. The tractor mower of claim 5, wherein said steering member rotates through a maximum travel angle of at least 45 degrees and not more than 150 degrees during rotation between said left and right-most positions.

7. The tractor mower of claim 5, wherein when said steering member is rotated half way between said left and right-most positions said steering member is in a center position and said front wheels exhibit a steering angle of approximately zero.

8. The tractor mower of claim 7, wherein said central pivot assembly is configured such that rotation of said steering member in said first direction from said center position to said right-most position includes a right steering only range of rotation and a right steering and braking range of rotation, wherein during said right steering only range of rotation said steering member rotates but said right braking member does not rotate, wherein during said right steering and braking range of rotation said steering member and said right braking member both rotate, wherein said central pivot assembly is configured such that rotation of said steering member in said second direction from said center position to said left-most position includes a left steering only range of rotation and a left steering and braking range of rotation, wherein during said left steering only range of rotation said steering member rotates but said left braking member does not rotate, wherein during said left steering and braking range of rotation said steering member and said left braking member both rotate.

9. The tractor mower of claim 8, wherein each of said left and right steering only ranges of rotation extend through an angle of at least 10 degrees and not more than 45 degrees.

10. The tractor mower of claim 8, wherein each of said left and right steering and braking ranges of rotation extend through an angle of at least 20 degrees and not more than 90 degrees.

11. The tractor mower of claim 8, wherein during said left and right steering and braking ranges of rotation said steering member engages said left and right braking members respectively so that rotation of said steering member causes corresponding rotation of said left and right braking members.

12. The tractor mower of claim 11, wherein said steering member comprises at least one engagement projection for engaging said left and right braking members during said left and right steering and braking ranges of rotation.

13. The tractor mower of claim 12, wherein said engagement projection does not engage said left and right braking members during said left and right steering only range of rotation.

14. The tractor mower of claim 1, wherein said steering system is configured to steer said left and right front wheels between a left full steering position and a right full steering position, wherein when said steering system is in said left full steering position said left front wheel is positioned at a left steering angle of at least 80 degrees, wherein when said steering system is in said right full steering position said right front wheel is positioned at a right steering angle of at least 80 degrees.

15. The tractor mower of claim 14, wherein when said steering system is in said left and right full steering positions the difference between the steering angles of the left and right wheels is at least 10 degrees.

16. The tractor mower of claim 1, wherein said braking system further comprises left and right brake application members and left and right tension assemblies, wherein movement of said left and right brake application members in a braking direction causes application of said braking force to said left and right wheels respectively, wherein said left and right tension assemblies connect said left and right braking rods to said left and right brake application members respectively.

17. The tractor mower of claim 16, wherein said tension assemblies include an adjustment mechanism configured to adjust a magnitude of the braking force applied to said rear wheels when said front wheels are positioned at a particular steering angle.

18. A tractor mower comprising:
   steerable left and right front wheels;
   left and right rear drive wheels;
   an engine for providing power to drive said rear wheels; and
   a steering system coupled to said front steerable wheels and operable to steer said left and right front wheels at different steering angles,
   wherein said steering system comprises—
      a steering wheel,
      a steering member rotatable by said steering wheel on a main pivot axis,
      left and right intermediate pivot members rotatable on respective left and right intermediate pivot axes,
      left and right outer pivot members rotatable on respective left and right outer pivot axes,
      left and right steering rods connecting said steering member and said left and right intermediate pivot members respectively, and
      left and right rotation transfer members connecting said left and right intermediate pivot members and said left and right outer pivot members respectively in a manner such that rotation of said left and right intermediate pivot members causes rotation of said left and right outer pivot members respectively,
   wherein said steering system is configured to steer said left and right front wheels between a left full steering position and a right full steering position, wherein when said steering system is in said left full steering position said left front wheel is positioned at a left steering angle of at least 80 degrees, wherein when said steering system is in said right full steering position said right front wheel is positioned at a right steering angle of at least 80 degrees, wherein when said steering system is in said left and right full steering positions the difference between the steering angles of the left and right wheels is at least 10 degrees.

19. The tractor mower of claim 18, wherein said left and right intermediate pivot members comprise respective left and right lever members extending outwardly from said left and right intermediate pivot axes respectively, wherein said left and right steering rods are coupled to said left and right lever members at respective left and right steering rod connection locations that are spaced from said left and right intermediate pivot axes respectively.

20. The tractor mower of claim 19, wherein when said left and right front wheels are positioned for straight forward travel said steering system is in a centered position, wherein when said steering system is in said centered position said left and right steering rod connection locations are not aligned with a transverse steering axis extending between left and right intermediate pivot axes.

21. The tractor mower of claim 20, wherein when left and right skew angles are defined between said left and right connection location and said transverse steering axis, wherein when said steering system is in said centered position said left and right skew angles are at least 5 degrees and not more than 45 degrees.

22. The tractor mower of claim 21, wherein when said steering system is in said centered position said left and right steering rod connection locations are positioned rearward of said transverse steering axis.

23. The tractor mower of claim 20, wherein when said steering system is in said full left and full right steering positions said left and right steering rod connection locations are positioned on opposite sides of said transverse steering axis.

24. The tractor mower of claim 18, further comprising an independent rear braking system capable of applying a braking force to said left and right rear wheels independently of one another, wherein said steering system is coupled to said independent rear braking system.

25. The tractor mower of claim 24, wherein said independent rear braking system comprise left and right tension assemblies that each include an adjustment mechanism configured to adjust a magnitude of the braking force applied to said rear wheels when said front wheels are positioned at a particular steering angle.

26. A method of operating a tractor mower comprising:
(a) rotating a steering wheel of said tractor mower from a central position to a full right steering position, wherein a first portion of said rotating of step (a) causes left and right front wheels of said tractor mower to steer to the right and does not simultaneously cause a braking force to be applied to a right rear wheel of said tractor mower, wherein a second portion of said rotating of step (a) simultaneously causes the left and right front wheels to steer to the right and causes a braking force to be applied to said right rear wheel; and
(b) rotating a steering wheel of said tractor mower from a central position to a full left steering position, wherein a first portion of said rotating of step (b) causes the left and right front wheels to steer to the left and does not simultaneously cause a braking force to be applied to a left rear wheel of said tractor mower, wherein a second portion of said rotating of step (b) simultaneously causes the left and right front wheels to steer to the left and causes a braking force to be applied to said left rear wheel.

27. The method of claim 26, wherein during said first portion of said rotating of steps (a) and (b) said left and right front wheels travel through a first steering angle range of at least 20 degrees and not more than 60 degrees respectively, wherein during said second portion of said rotating of steps (a) and (b) said left and right front wheels travel through a second steering angle range of at least 40 degrees and not more than 90 degrees respectively.

* * * * *